United States Patent [19]

Inutsuka

[11] Patent Number: 5,867,796
[45] Date of Patent: Feb. 2, 1999

[54] PORTABLE TELEPHONE SET CAPABLE OF BEING PUT IN A HOLDING MODE BY OPERATION OF A VIBRATION UNIT WHICH IS FOR ANNOUNCING RECEPTION OF AN INCOMING CALL TO A USER

[75] Inventor: Kyoko Inutsuka, Tokyo, Japan

[73] Assignee: NEC Corporation, Tokyo, Japan

[21] Appl. No.: 639,378

[22] Filed: Apr. 26, 1996

[30] Foreign Application Priority Data

Apr. 28, 1995 [JP] Japan ................................ 7-128895

[51] Int. Cl.$^6$ ........................................... H04Q 7/20
[52] U.S. Cl. ..................... 455/567; 455/31.3; 455/426; 455/11.1; 340/825.44; 370/315
[58] Field of Search ................................ 455/31.2, 31.3, 455/403, 426, 458, 459, 460, 461, 550, 553, 567, 575, 90, 11.1, 15; 370/315; 340/825.44, 825.46, 825.49

[56] References Cited

U.S. PATENT DOCUMENTS

| | | | |
|---|---|---|---|
| 4,421,953 | 12/1983 | Zielinski | 455/567 |
| 4,659,878 | 4/1987 | Dinkins | 455/11.1 |
| 4,906,989 | 3/1990 | Kasugai | 455/11.1 |
| 5,140,626 | 8/1992 | Ory | 379/57 |
| 5,311,570 | 5/1994 | Grimes et al. | 455/31.3 |
| 5,315,636 | 5/1994 | Patel | 455/461 |
| 5,375,161 | 12/1994 | Fuller et al. | 455/461 |
| 5,404,391 | 4/1995 | Wavroch | 379/59 |
| 5,428,663 | 6/1995 | Grimes et al. | 455/31.2 |
| 5,442,814 | 8/1995 | Seo | 455/550 |

FOREIGN PATENT DOCUMENTS

| | | |
|---|---|---|
| 63-175533 | 7/1988 | Japan . |
| 3-283852 | 12/1991 | Japan . |
| 2250890 | 6/1992 | United Kingdom . |

*Primary Examiner*—Dwayne D. Bost
*Assistant Examiner*—Nay Maung
*Attorney, Agent, or Firm*—Ostrolenk, Faber, Gerb & Soffen, LLP

[57] ABSTRACT

A vibration unit is for use in combination with a portable telephone apparatus having a holding mode in which connection is held between the portable telephone apparatus and a base station assigned to the portable telephone apparatus. The portable telephone apparatus transmits a reception information signal in response to reception of an incoming call signal directed to the portable telephone apparatus. Supplied with the reception information signal, the vibration unit makes a vibrator vibrate to announce reception of the incoming call signal to a user of the portable telephone apparatus. When operated by the user, a holding switch produces a switch operation signal. In response to the switch operation signal, a unit control section controls to make a unit radio section transmit a holding indication signal towards the portable telephone apparatus. Supplied with the holding indication signal, the portable telephone apparatus is put in the holding mode.

12 Claims, 9 Drawing Sheets

| SYNCHRONOUS SIGNAL | IDENTIFICATION CODE | INCOMING CALL INFORMATION | CHECK CODE |
|---|---|---|---|
| 34 | 35 | 36 | 37 |

FIG. 3A

| SYNCHRONOUS SIGNAL | IDENTIFICATION CODE | INCOMING CALL INFORMATION | CALLER'S TELEPHONE NUMBER | CHECK CODE |
|---|---|---|---|---|
| 34 | 35 | 36 | 38 | 37 |

FIG. 3B

| SYNCHRONOUS SIGNAL | IDENTIFICATION CODE | HOLDING INDICATION SIGNAL | CHECK CODE |
|---|---|---|---|
| 41 | 42 | 43 | 44 |

_US 5,867,796_

PORTABLE TELEPHONE SET CAPABLE OF BEING PUT IN A HOLDING MODE BY OPERATION OF A VIBRATION UNIT WHICH IS FOR ANNOUNCING RECEPTION OF AN INCOMING CALL TO A USER

BACKGROUND OF THE INVENTION

This invention relates to a portable telephone set in which reception of an incoming call is announced to a user by means of vibration.

There is known a portable telephone apparatus containing a vibrator for announcing reception of an incoming call by vibrating an apparatus body of the telephone apparatus instead of ringing a call bell. Admittedly, such a call reception announcing function is extremely effective during a call standby state while a user is attending a conference or on board a train. It is essential, however, to carry the telephone apparatus in contact with a user's body all the time.

Although the portable telephone apparatus has become more and more compact, the telephone apparatus is still too large to be carried in contact with the user's body all the time. Also in view of the operability, a restriction is imposed on reduction in size of the telephone apparatus. As a consequence, the telephone apparatus is often carried in a bag or the like. Thus, the call reception announcing function via vibration has not effectively been utilized.

Recently, there is known another technique utilizing a wireless vibration unit which includes a vibrator which separates from a telephone apparatus in the manner known in Japanese Patent Prepublication (Kokai or Publication of Unexamined Patent Application) No. 283852/1991 by Sakurai et al. and in Japanese Patent Prepublication (Kokai or Publication of Unexamined Patent Application) No. 175533/1988 by Murakami. When an incoming call is received in the telephone apparatus, reception is informed to the wireless vibration unit through a wireless path. In response, the vibration unit is made to vibrate to thereby announce reception of the incoming call to a user.

In the above-mentioned technique, however, the wireless vibration unit carries out no more than announcement of reception of the incoming call in the portable telephone apparatus. Sometimes, the user may want to hold the incoming call in dependence upon a caller. For this purpose, the user must take the portable telephone apparatus from his bag, identify the caller, judge whether or not the incoming call is to be put in a holding mode, carry out a holding operation, and transmit to the caller a message, for example, that the user is currently unable to answer. Thus, it takes a long time to respond. In particular, when the user can not freely move, for example, in an overcrowded train or when the portable telephone apparatus is out of reach of the user, the operability is extremely poor.

SUMMARY OF THE INVENTION

It is therefore an object of this invention to provide a portable telephone set which is capable of being put in a holding mode by operation of a vibration unit.

It is another object of this invention to provide a vibration unit which can be used in a portable telephone set of the type described.

It is still another object of this invention to provide a portable telephone apparatus which can be used in combination with a vibration unit of the type described.

Other objects of this invention will become clear as the description proceeds.

According to an aspect of this invention, there is provided a vibration unit for use in combination with a portable telephone apparatus having a holding mode in which connection is held between the portable telephone apparatus and a base station assigned to the portable telephone apparatus. The portable telephone apparatus transmits a reception information signal in response to reception of an incoming call directed to the portable telephone apparatus. The vibration unit comprises unit receiving means for receiving the reception information signal, a vibrator connected to the unit receiving means for vibrating when the unit receiving means receives the reception information signal, a holding switch, and unit transmitting means connected to the holding switch for transmitting a holding indication signal towards the portable telephone apparatus in response to operation of the holding switch. The holding indication signal makes the portable telephone apparatus be put in the holding mode.

According to another aspect of this invention, there is provided a vibration unit for use in combination with a portable telephone apparatus having a holding mode in which connection is held between the portable telephone apparatus and a base station assigned to the portable telephone apparatus. The portable telephone apparatus transmits a reception information signal in response to reception of an incoming call signal directed to the portable telephone apparatus. The vibration unit comprises a vibrator, a holding switch for producing a switch operation signal when the holding switch is operated, and a unit radio section for receiving the reception information signal to produce a unit reception signal and for transmitting a holding indication signal towards the portable telephone apparatus. The holding indication signal makes the portable telephone apparatus be put in the holding mode. The vibration unit further comprises a unit control section connected to the vibrator, the holding switch, and the unit radio section for controlling operation of the vibrator in response to the unit reception signal and the switch operation signal and for controlling the unit radio section in response to the switch operation signal to make the unit radio section transmit the holding indication signal towards the portable telephone apparatus.

According to still another aspect of this invention, there is provided a vibration unit for use in combination with a portable telephone apparatus transmitting a reception information signal when supplied with an incoming call signal directed to the portable telephone apparatus. The vibration unit comprises unit receiving means for receiving the reception information signal, a vibrator connected to the unit receiving means for vibrating when the receiving means receives the reception information signal, a unit display section connected to the unit receiving means for displaying reception information relating to the reception information signal, signal producing means for producing a holding indication signal which is for indicating that the incoming call is to be put in a holding mode, and unit transmitting means connected to the signal producing means for transmitting the holding indication signal towards the portable telephone apparatus.

According to this invention, there is further provided a portable telephone apparatus for use in communication with a base station assigned to the portable telephone apparatus. The portable telephone apparatus has a holding mode in which connection is held between the portable telephone apparatus and the base station. The portable telephone apparatus comprises first receiving means for receiving an incoming call signal directed to the portable telephone apparatus from the base station, second receiving means for receiving a holding indication signal transmitted from an external area of the portable telephone apparatus, and hold making means connected to the first and the second receiving means and responsive to the holding indication signal for making the telephone apparatus be put in the holding mode when the first receiving means receives the incoming call signal.

According to this invention, there is further provided a combination of a portable telephone apparatus and a vibration unit. In the combination, the portable telephone apparatus comprises first receiving means for receiving an incoming call signal directed to the portable telephone apparatus from a base station which is assigned to the portable telephone apparatus, first transmitting means connected to the first receiving means for transmitting a reception information signal when the first receiving means receives the incoming call signal, second receiving means for receiving a holding indication signal transmitted from the vibration unit towards the portable telephone apparatus, and second transmitting means connected to the second receiving means for transmitting a holding signal towards the base station when the second receiving means receives the holding indication signal. The base station is responsive to the holding signal to make the telephone apparatus be put in a holding mode in which connection is held between the portable telephone apparatus and the base station. In the combination, the vibration unit comprises unit receiving means for receiving the reception information signal, a vibrator connected to the unit receiving means for vibrating when the unit receiving means receives the reception information signal, a holding switch, and unit transmitting means connected to the holding switch for transmitting the holding indication signal towards the portable telephone apparatus in response to operation of the holding switch.

BRIEF DESCRIPTION OF THE DRAWING

FIG. 3A is a first signal format of a second radio signal in a first case where the second radio signal is transmitted from the portable telephone apparatus towards the wireless vibration unit;

FIG. 3B is a second signal format of the second radio signal in the first case;

DESCRIPTION OF THE PREFERRED EMBODIMENTS

Figure 1:
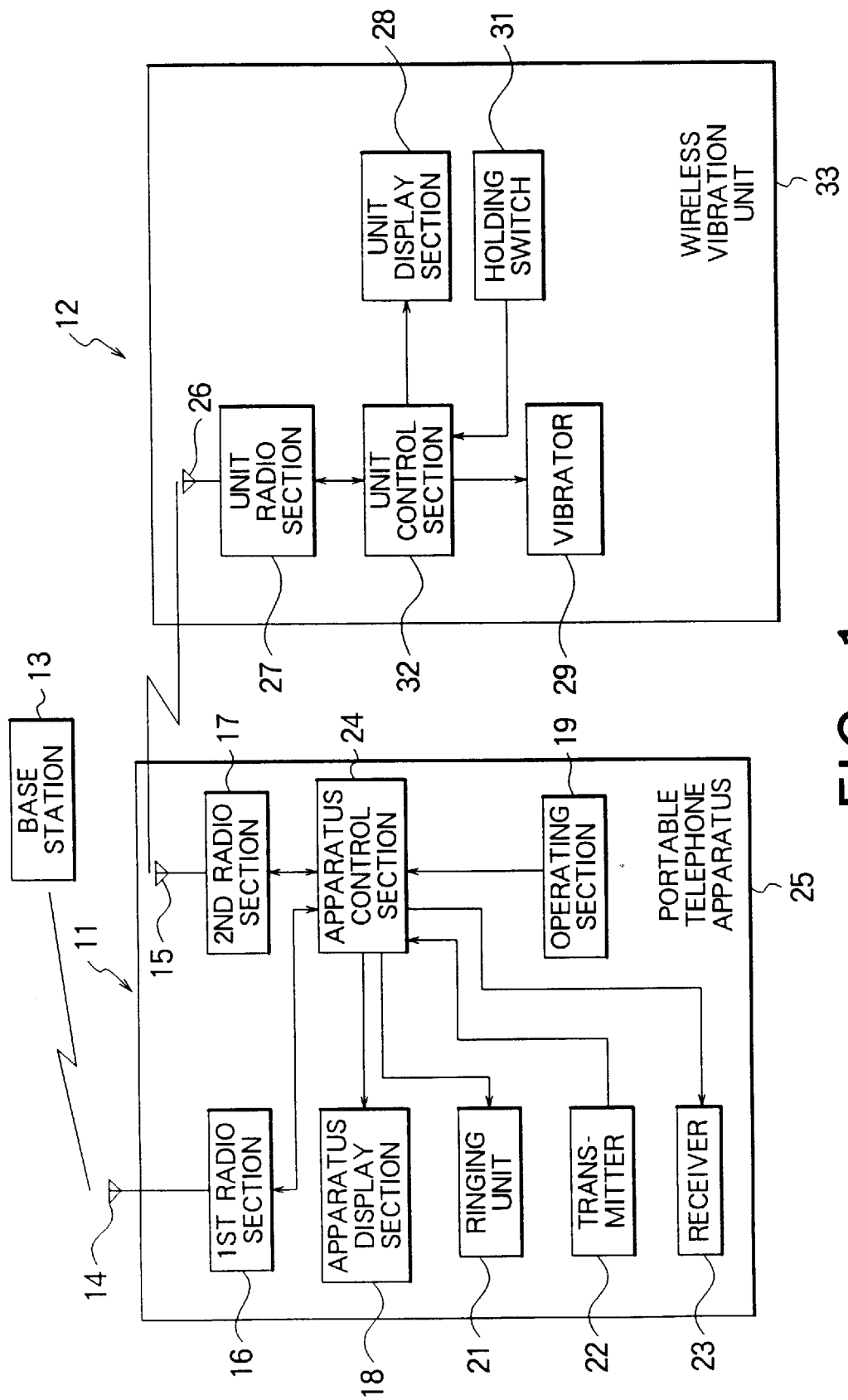
FIG. 1 is a block diagram for describing a portable telephone apparatus and a wireless vibration unit according to a first embodiment of this invention.

Referring to FIG. 1, description will now be made with respect to a portable telephone set according to a first embodiment of this invention. The portable telephone set comprises a portable telephone apparatus 11 and a wireless vibration unit 12 connected to the portable telephone apparatus 11 through a wireless path known in the art. The portable telephone apparatus 11 has a holding mode which is known in the art and in which connection is held between the portable telephone apparatus 11 and a base station 13 assigned to the portable telephone apparatus 11. The connection between the portable telephone apparatus 11 and the base station 13 is made by the use of a first radio signal having a first frequency band and a signal format which are known in the art.

A connection between the portable telephone apparatus 11 and the wireless vibration unit 12 is made by the use of a second radio signal having a second frequency band different from the first frequency band. The second radio signal has a signal format which will later be described taking examples thereof. The second radio signal has intensity smaller than that of the first radio signal.

At first, the description will be made with respect to the portable telephone apparatus 11. The portable telephone apparatus 11 comprises first and second antennas 14 and 15 and first and second radio sections 16 and 17 which are connected to the first and the second antennas 14 and 15, respectively. The first radio section 16 is adapted to the first frequency band and operates to transmit or to receive only the first radio signal through the first antenna 14. The second radio section 17 is adapted to the second frequency band and operates to transmit or to receive only the second radio signal through the second antenna 15.

The portable telephone apparatus 11 further comprises an apparatus displaying section 18, an operating section 19, a ringing unit 21, a transmitter 22, and a receiver 23. The apparatus displaying section 18 is for displaying various information such as a caller's telephone number, setup information of the portable telephone apparatus 11, use information, and so on. The operating section 19 is for carrying out various operation of the portable telephone apparatus 11 and includes number entry keys and various function keys in the manner known in the art. The ringing unit 21 is for generating a ringing tone to inform or announce reception of an incoming call of the portable telephone apparatus 11 to a user. The transmitter 22 is for converting an audio signal to an electric signal in the manner known in the art. The receiver 23 is for converting an electric signal to an audio signal in the manner known in the art.

The portable telephone apparatus 11 further comprises an apparatus control section 24 connected to the first and the second radio sections 16 and 17, the apparatus displaying section 18, the operating section 19, the ringing unit 21, the transmitter 22, and the receiver 23. The apparatus control section 24 is for controlling operations of the first and the second radio sections 16 and 17, the apparatus displaying section 18, the operating section 19, the ringing unit 21, the transmitter 22, and the receiver 23 and for controlling various other operations of the portable telephone apparatus 11. Each portion of the portable telephone apparatus 11 is held to an apparatus body or an apparatus frame 25.

Next, the description will be directed to the wireless vibration unit 12. The wireless vibration unit 12 comprises a unit antenna 26, a unit radio section 27, a unit displaying section 28, a vibrator 29, and a holding switch 31. The unit radio section 27 is adapted to the second frequency and therefore operates to transmit or to receive the second radio signal through the unit antenna 26. The unit displaying section 28 is for displaying various information such as the caller's telephone number, a transmitter's name, and so on which are carried by the second frequency signal. The vibrator 29 is for generating a vibration to inform or announce reception of the incoming call of the portable telephone apparatus 11 to the user. The holding switch 31 is operated by the user to place the portable telephone apparatus 11 in the holding mode in the manner which will later be described.

The wireless vibration unit 12 further comprises a unit control section 32. The unit control section 32 is connected to the unit radio section 27, the unit displaying section 28, and the vibrator 29 and is for controlling operation of them. Furthermore, the unit control section 32 is connected to the holding switch 31 and makes the unit radio section 27 transmit, as the second radio signal, a particular signal or a holding indication signal through the unit antenna 31 when the holding switch 31 is operated by the user. Each section of the wireless vibration unit 12 is held to a unit body or a unit frame 33.

The wireless vibration unit 12 must be provided with a battery (not shown) for transmitting or receiving the second radio signal. The battery may be small because the second radio signal is relatively weak. The wireless vibration unit 12 may be manufactured to have a small box shape or a thin card shape.

Figure 2:
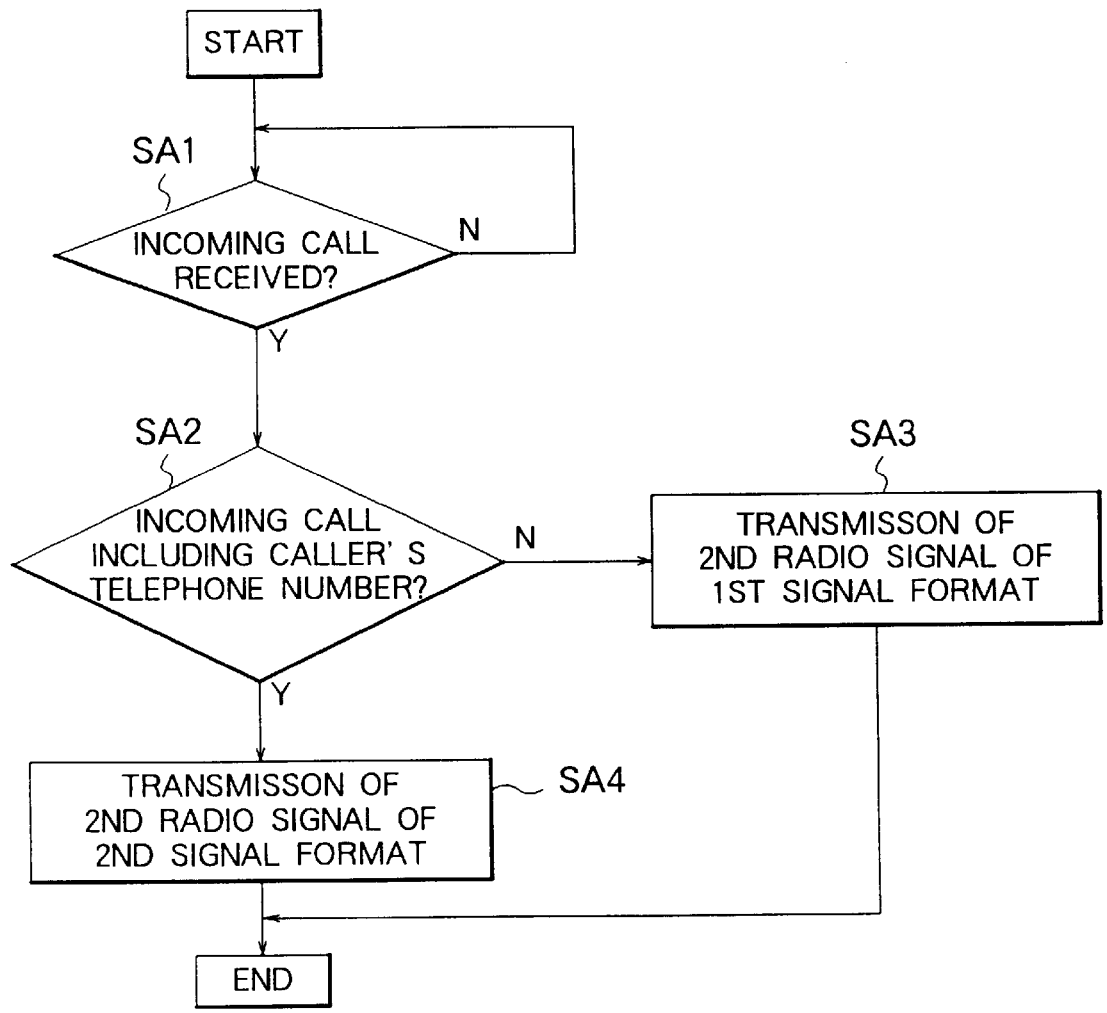
FIG. 2 is a flow chart for describing operation of the portable telephone apparatus in relation to reception of a first radio signal which is transmitted between the portable telephone apparatus and a base station.

Referring to FIG. 2 in addition to FIG. 1, the description will be made with respect to operation of the portable telephone apparatus 11. In a case where the portable telephone apparatus 11 calls the base station 13, the portable telephone apparatus 11 has operation which is similar to that of a conventional portable telephone system. Accordingly, the description is directed to only the incoming call that is transmitted from the base station 13.

After start, the apparatus control section 24 determines at a first step SA1 whether or not the first radio section 17 is receiving an incoming call through the first antenna 14. On carrying out the first step SA1, a combination of the first radio section 17 and the apparatus control section 24 is referred to as a first receiving arrangement.

Only when the first radio section 17 receives an incoming call, the first step SA1 is followed by a second step SA2 at which the apparatus control section 24 determines whether or not the incoming call includes the caller's telephone number. When the incoming call does not include the caller's telephone number, the second step SA2 proceeds to a third step SA3 at which the apparatus control section 24 and the second radio section 17 cooperates with each other to transmit, through the second antenna 15 as the second radio signal, a first radio reception information signal having a first signal format illustrated in FIG. 3A. When the incoming call includes the caller's telephone number, the second step SA2 proceeds to a fourth step SA4 at which the apparatus control section 24 and the second radio section 17 cooperates with each other to transmit, through the second antenna 15 as the second radio signal, a second radio reception information signal having a second signal format illustrated in FIG. 3B. On carrying out each of the third and the fourth steps SA3 and SA4, a combination of the apparatus control section 24 and the second radio section 17 is referred to as a first transmitting arrangement.

As depicted in FIG. 3A, the first signal format includes a synchronous signal 34, an identification code 35, incoming call information 36, and a check code 37. As depicted in FIG. 3B, the second signal format additionally includes a caller's telephone number 38. The synchronous signal 34 is for indicating a start of the second radio signal. The identification code 35 is for identifying the portable telephone set from another portable telephone set. The incoming call information 36 is for informing, to the wireless vibration unit 12, that the portable telephone apparatus 11 has received an incoming call. As the check code 37, use is made of a parity check bit or an error correcting code such as a BHC and the like.

Figure 4:
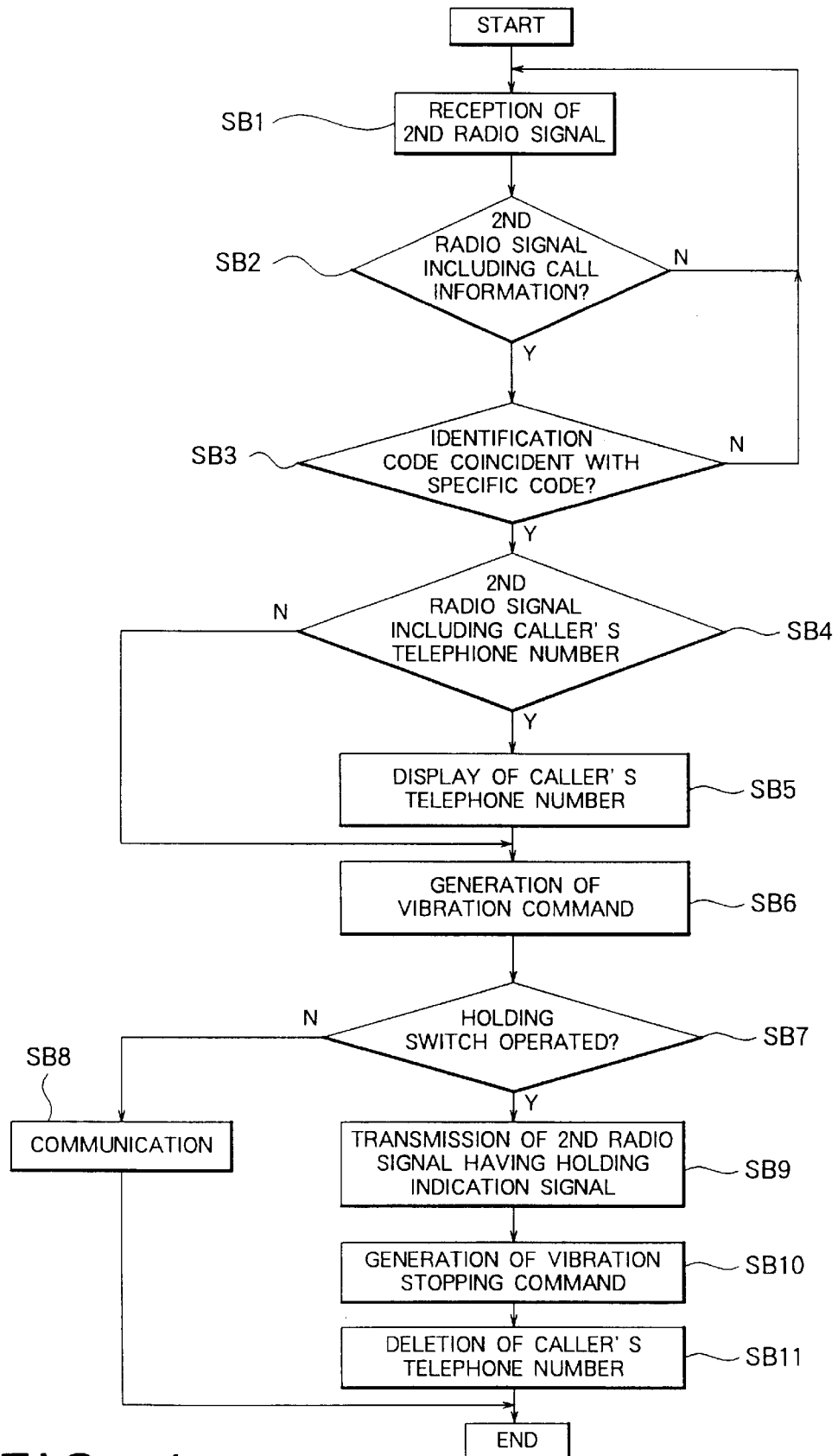
FIG. 4 is a flow chart for describing operation of the wireless vibration unit.

Referring to FIG. 4 in addition to FIGS. 1 through 3, the description will be made with respect to operation of the wireless vibration unit 12. After start, the unit radio section 27 and the unit control section 32 cooperate with each other to carry out reception operation for the second radio signal at a first step SB1. When supplied with one of the first or the second radio reception information signals, the unit radio section 27 produces a unit reception signal. On carrying out the first step SB1, a combination of unit radio section 27 and the unit control section 32 is referred to as a unit receiving arrangement.

The first step SB1 is followed by a second step SB2 at which the unit control section 32 determines whether or not the second radio signal includes call information relating to the incoming call information 36. When the second radio signal does not include the call information, the second step SB2 returns to the first step SB1. When the second radio signal includes the call information, the second step SB2 proceeds to a third step SB3 at which the unit control section 32 determines whether or not the identification code 35 is coincident with a specific code which is assigned to the portable telephone set. When the identification code 35 is not coincident with the specific code, the third step SB3 returns to the first step SB1. When the identification code 35 is coincident with the specific code, the third step SB3 proceeds to a fourth step SB4 at which the unit control section 32 determines whether or not the second radio signal includes the caller's telephone number 38. When the second radio signal includes the caller's telephone number 38, the fourth step SB4 proceeds to a fifth step SB5 at which the unit control section 32 makes the unit displaying section 28 display the caller's telephone number as user information. Regardless of the presence or absence of the caller's telephone number 38 in the second radio signal, the unit control section 32 transmits a vibration command to the vibrator 29 in response to the unit reception signal at a sixth step SB6. In accordance with the vibration command, the vibrator 29 generates a predetermined vibration to announce reception of the incoming call to the user.

The sixth step SB6 is followed by a seventh step SB7 at which the user determines, with reference to the user information, about whether or not it is possible, or desirable, to carry out a response to the incoming call. In a first case where the response is possible or desirable, the seventh step SB7 proceeds to an eighth step SB8 at which the user operates the portable telephone apparatus 11 to carry out a predetermined operation thereof for the response. In response, the unit control section 32 supplies a vibration stopping command to the vibrator 29. In response to the vibration stopping command, the vibrator 29 stops the predetermined vibration. The predetermined operation enables a communication between the portable telephone apparatus 11 and the base station 13 in the manner known in the art.

In a second case where the response is impossible, or not desirable, at the current time, at the seventh step SB7, the user operates the holding switch 31. When operated, the holding switch 31 produces a switch operation signal. In the second case, the seventh step SB7 proceeds to a ninth step SB9 in which the unit control section 32 and the unit radio section 27 cooperates with each other to transmit, through the unit antenna 26 as the second radio signal, a radio signal having a signal format illustrated in FIG. 5. On carrying out the ninth step SB9, a combination of the unit control section 32 and the unit radio section 27 is referred to as a unit transmitting arrangement.

Figures 5, 6:
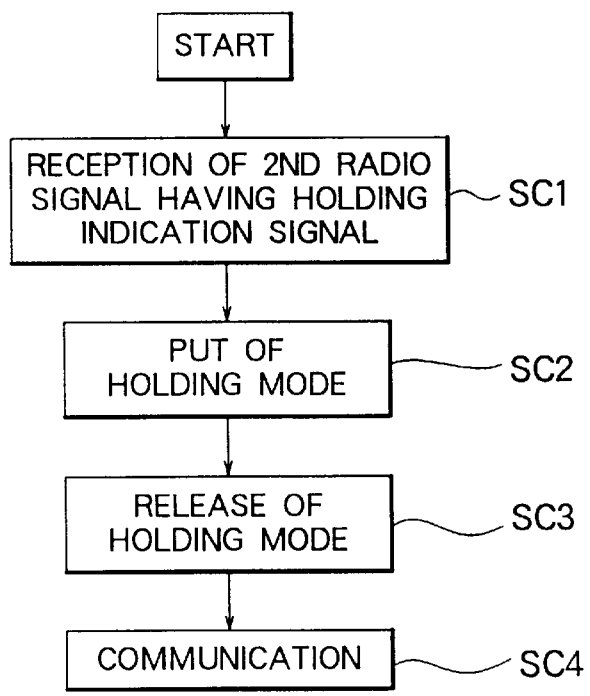
FIG. 5 is a signal format of the second signal in a second case where the second radio signal is transmitted from the wireless vibration unit towards the portable telephone apparatus.
FIG. 6 is a flow chart for describing operation of the portable telephone apparatus in relation to reception of the second radio signal.

The signal format of FIG. 5 includes a synchronous signal 41, an identification code 42, a holding indication signal 43, and a check code 44. The synchronous signal 41, the identification code 42, and the check code 44 correspond to the synchronous signal 34, the identification code 35, and the check code 37 in the first signal format, respectively. In the manner which will later be described with reference to FIG. 6, the holding indication signal 43 is used to place the portable telephone apparatus 11 in the holding mode.

The ninth step SB9 is followed by a tenth step SB10 at which the unit control section 32 transmits the vibration stopping command to the vibrator 29 in response to the switch operation signal. In accordance with the vibration stopping command, the vibrator 29 stops the predetermined vibration. On carrying out the tenth step SB10, the unit control section 32 will be referred to as a vibration stopping arrangement.

The tenth step SB10 is followed by an eleventh step SB11. At the eleventh step SB11, the unit control section 32 makes the unit displaying section 28 delete the caller's telephone number.

Turning to FIG. 6, a description will be made with respect to a case where the portable telephone apparatus 11 receives the second radio signal. At a first step SC1, the second radio section 17 and the apparatus control section 24 cooperate with each other to receive, through the second antenna 24, the second radio signal having the identification code 42 and the holding indication signal 43. On carrying out the first step SC1, a combination of the second radio section 17 and the apparatus control section 24 is referred to as a second receiving arrangement.

The first step SC1 is followed by a second step SC2 at which, in the manner known in the art, the apparatus control section 24 causes the portable telephone apparatus 11 to be placed in the holding mode. More particularly, the apparatus control section 24 and the first radio section 16 cooperate with each other to transmit a holding signal through the first antenna 14 towards the base station 13. On transmitting the holding signal, a combination of the first radio section 16 and the apparatus control section 24 is referred to as a second transmitting arrangement.

In response to the holding signal, the base station 13 transmits, towards the caller, a message representing that the user can not carry out the predetermined communication at the current time. This means that the apparatus control section 24 operates as a hold making arrangement.

When it is desired to carry out the predetermined communication at a particular time after the current time, the user operates the operating section 19 to release the holding mode at a third step SC3. When the holding mode is released, the third step SC3 is followed by a fourth step SC4 at which it becomes possible to carry out the predetermined communication.

Figure 7:
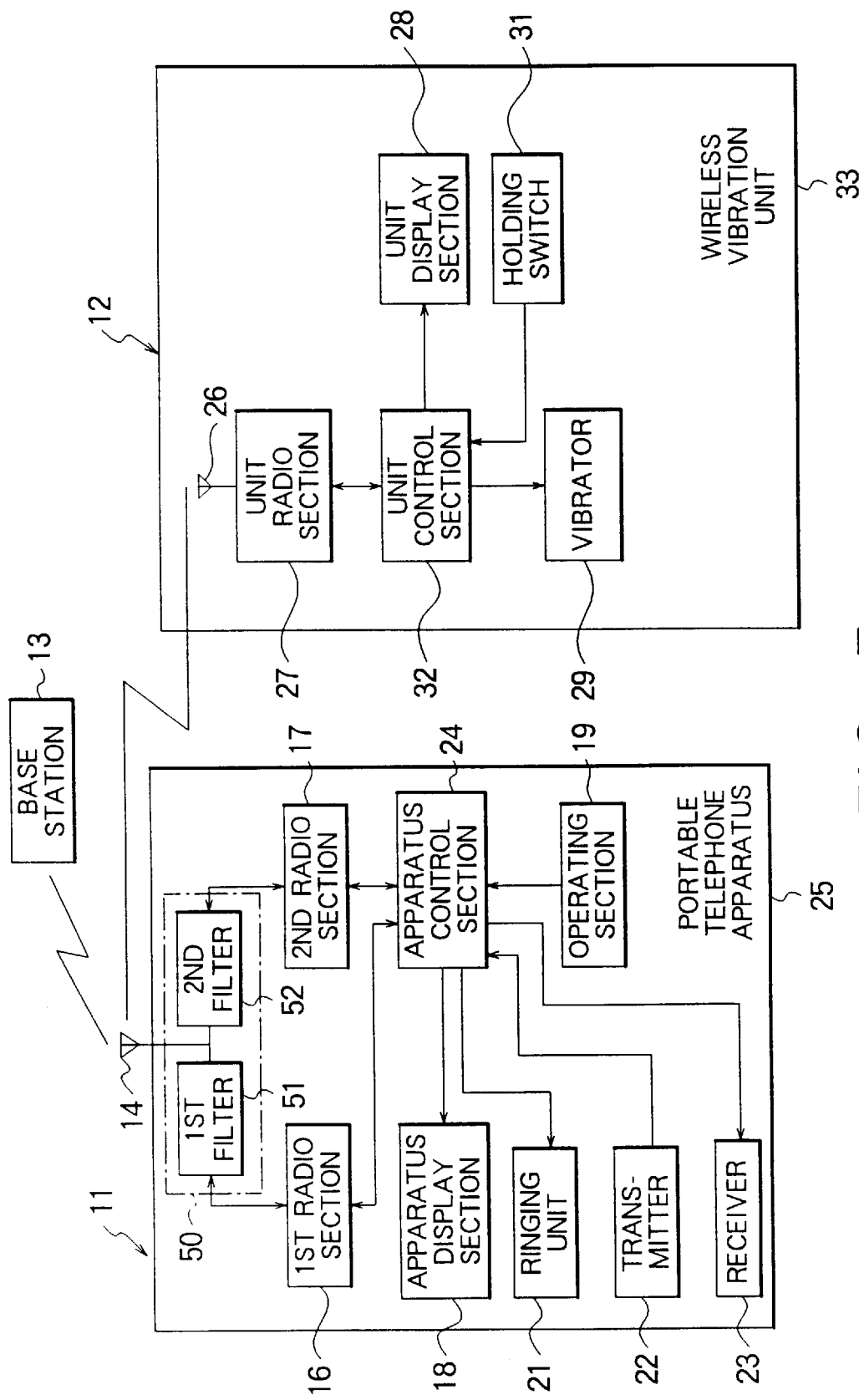
FIG. 7 is a block diagram for describing a portable telephone apparatus and a wireless vibration unit according to a second embodiment of this invention.

Referring to FIG. 7 next, the description will be made with respect to a portable telephone set according to a second embodiment of this invention. Similar parts are designated by like reference numerals.

The portable telephone set further comprises a signal distributor 50. The signal distributor 50 comprises a first filter 51 and a second filter 52. The first filter 51 is connected between the first antenna 14 and the first radio section 16 and is for filtering only a signal having the first frequency band. Accordingly, the first radio signal is received only by the first radio section 16.

The second filter 52 is connected between the second antenna 15 and the second radio section 17 and is filtering only a signal having the second frequency band. Accordingly, the second radio signal is received only by the second radio section 17.

In the portable telephone set, it is unnecessary to provide the second antenna 15 shown in FIG. 1. In other words, the first antenna 14 is used as a common antenna which can receive the first and the second radio signals. The portable telephone set operates similarly to that of the portable telephone set of FIG. 1. The second radio signal has signal formats which are similar to those of the second radio signal used in the portable telephone set of FIG. 1.

Figure 8:
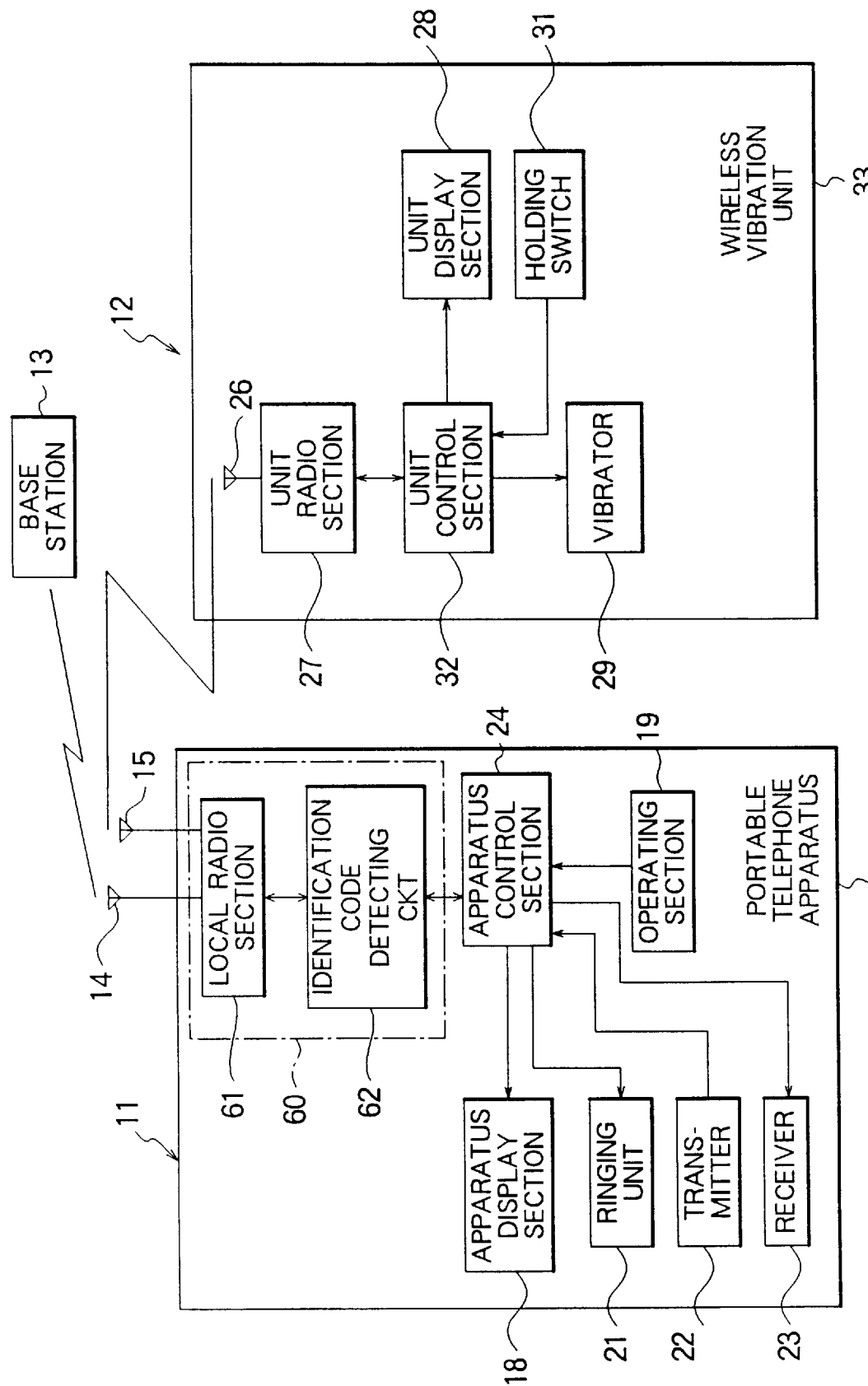
FIG. 8 is a block diagram for describing a portable telephone apparatus and a wireless vibration unit according to a third embodiment of this invention.

Referring to FIG. 8, the description will be made as regards a portable telephone set according to a third embodiment of this invention. Similar parts are designated by like reference numerals.

The portable telephone apparatus 11 of the portable telephone set comprises, instead of the first and the second radio sections 16 and 17 illustrated in FIG. 1, a common radio section 60 connected between each of the first and the second antennas 14 and 15 and the apparatus control section 24.

The common radio section 60 comprises a local radio section 61 and an identification code detecting circuit 62. The local radio section 61 is connected to the first and the second antennas 14 an 15 and is for transmitting or receiving a signal therethrough. The identification code detecting circuit 62 is connected to the local radio section 61 and the apparatus control section 24 and is for carrying out determinations as to whether or not the above-mentioned identification code is attached to signals which are supplied from the local radio section 61 and the apparatus control section 24, respectively. The identification code detecting circuit 62 produces a signal having a result of the determination. With reference to the result of the determination, the apparatus control section 24 judges whether the first radio signal or the second radio signal is received.

In addition, the local radio section 61 distributes the signal between the first and the second antennas 14 and 15 with reference to the result of the determination. In other words, the first and the second radio signal are transmitted from the first and the second antennas 14 and 15, respectively.

Figure 9:
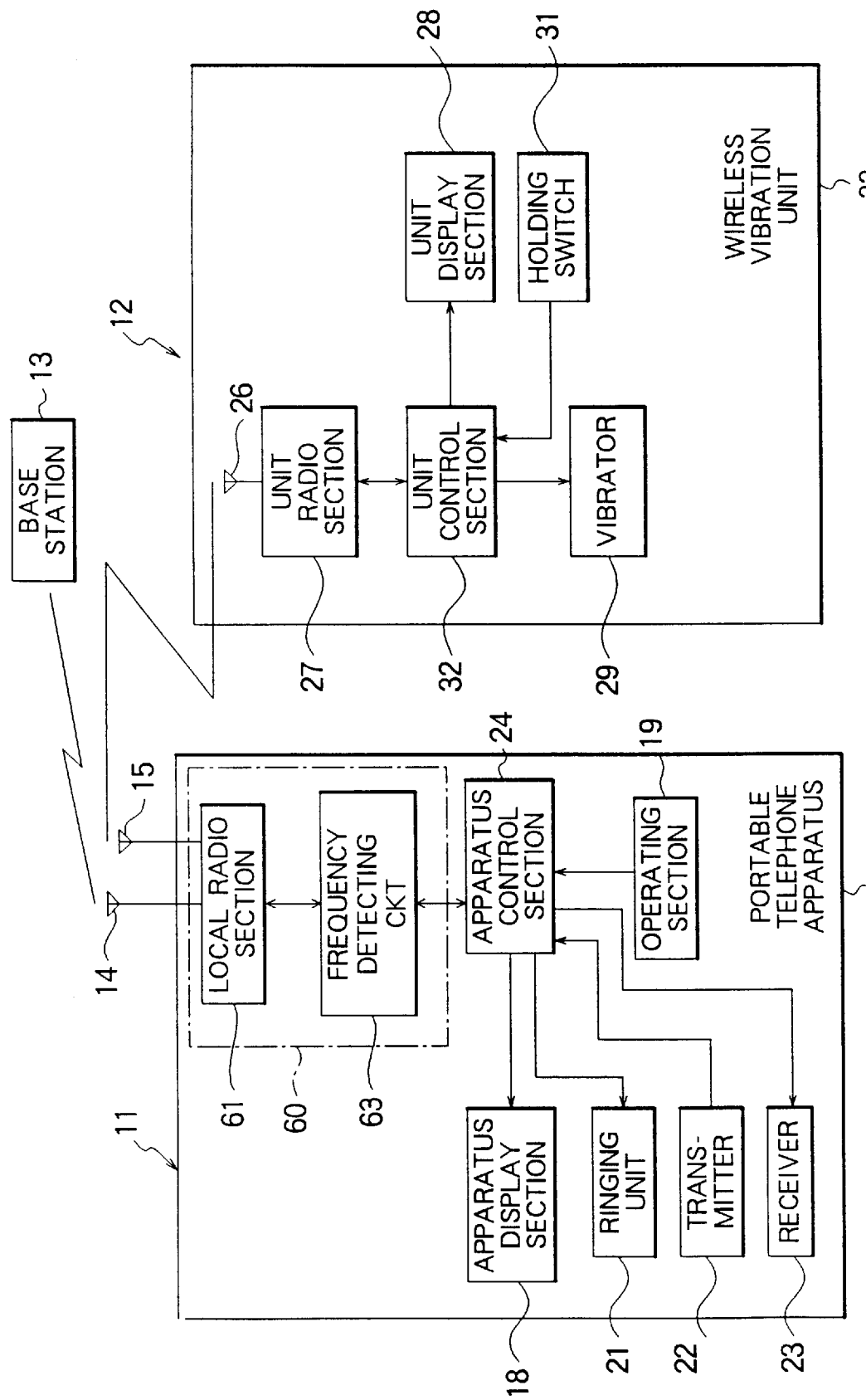
FIG. 9 is a block diagram for describing a portable telephone apparatus and a wireless vibration unit according to a fourth embodiment of this invention.

Referring to FIG. 9, the description will be made with respect to a portable telephone set according to a fourth embodiment of this inevention. Similar parts are designated by like reference numerals.

In the portable telephone set, the common radio section 60 comprises, instead of the identification code detecting circuit 62 illustrated in FIG. 8, a frequency detecting circuit 63. The frequency detecting circuit 63 is connected between the local radio section 61 and the apparatus control section 24 and detects the frequency of a signal which is supplied from the local radio section 61. The frequency is used for distributing the signal between the first and the second antennas 14 and 15.

Figure 10:
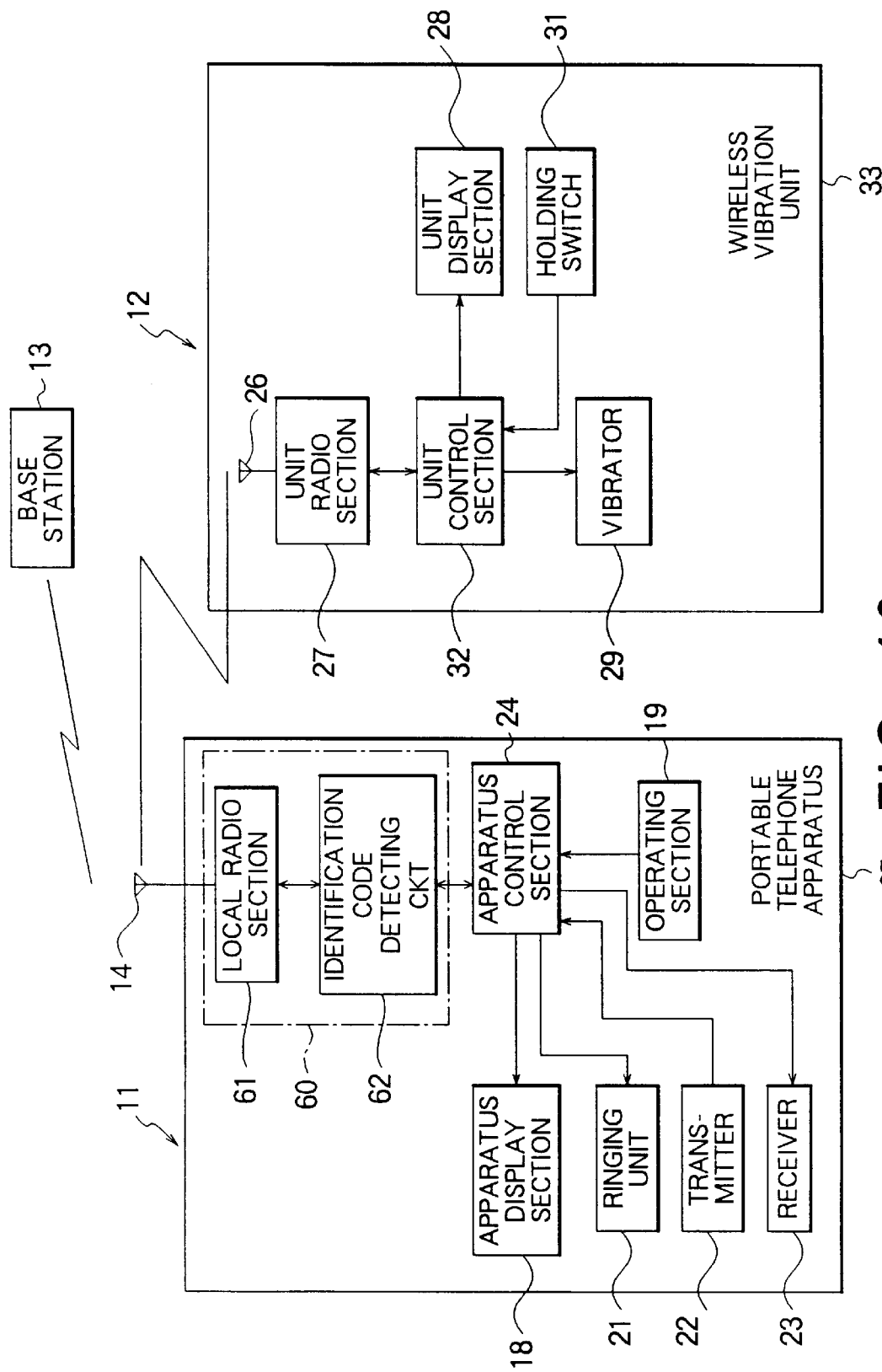
FIG. 10 is a block diagram for describing a portable telephone apparatus and a wireless vibration unit according to a fifth embodiment of this invention.

Referring to FIG. 10, the description will be made with respect to a portable telephone set according to a fifth embodiment of this invention. Similar parts are designated by like reference numerals.

In the portable telephone set, the first antenna 14 is used as a common antenna which can receive the first and the second radio signals. In this case, although both of the first and the second radio signals are transmitted through the common antenna, namely, the first antenna 14, the first and the second radio signals can be clearly distinguished with respect to each other. This is because the second radio signal has the identification code while the first radio signal does not have the identification code.

What is claimed is:

1. A vibration unit for use in combination with a portable telephone apparatus having a holding mode in which connection is held between said portable telephone apparatus and a base station assigned to said portable telephone apparatus, said portable telephone apparatus transmitting a reception information signal in response to reception of an incoming call directed to said portable telephone apparatus, said vibration unit comprising:

unit receiving means for receiving said reception information signal;

a vibrator connected to said unit receiving means for vibrating when said unit receiving means receives said reception information signal;

a holding switch; and unit transmitting means connected to said holding switch for transmitting a holding indication signal towards said portable telephone apparatus in response to operation of said holding switch, said holding indication signal causing said portable telephone apparatus to be put in said holding mode.

2. A vibration unit as claimed in claim 1, wherein said reception information signal carries reception information, said vibration unit further comprising unit displaying means connected to said unit receiving means for displaying said reception information.

3. A vibration unit as claimed in claim 1, further comprising vibration stopping means connected to said holding switch and said vibrator, wherein said vibrator is responsive to said operation of the holding switch for stopping said vibration of said vibrator.

4. A vibration unit for use in combination with a portable telephone apparatus having a holding mode in which connection is held between said portable telephone apparatus and a base station assigned to said portable telephone apparatus, said portable telephone apparatus transmitting a reception information signal in response to reception of an incoming call signal directed to said portable telephone apparatus, said vibration unit comprising:

a vibrator;

a holding switch for producing a switch operation signal when said holding switch is operated;

a unit radio section for receiving said reception information signal to produce a unit reception signal and for transmitting a holding indication signal towards said portable telephone apparatus, said holding indication signal causing said portable telephone apparatus to be put in said holding mode; and a unit control section connected to said vibrator, said holding switch, and said unit radio section for controlling operation of said vibrator in response to said unit reception signal and said switch operation signal and for controlling said unit radio section in response to said switch operation signal to cause said unit radio section to transmit said holding indication signal towards said portable telephone apparatus.

5. A vibration unit as claimed in claim 4, wherein said reception information signal carries reception information, said vibration unit further comprising unit displaying means connected to said unit control section for displaying said reception information.

6. A vibration unit for use in combination with a portable telephone apparatus, said portable telephone apparatus transmitting a reception information signal when supplied with an incoming call signal directed to said portable telephone apparatus, said vibration unit comprising:

unit receiving means for receiving said reception information signal;

a vibrator connected to said unit receiving means for vibrating when said unit receiving means receives said reception information signal;

a unit display section connected to said unit receiving means for displaying reception information relating to said reception information signal;

signal producing means for producing a holding indication signal which indicates that said incoming call is to be put in a holding mode; and unit transmitting means connected to said signal producing means for transmitting said holding indication signal towards said portable telephone apparatus.

7. A portable telephone apparatus for use in communication with a base station assigned to said portable telephone apparatus, said portable telephone apparatus having a holding mode in which connection is held between said portable telephone apparatus and said base station, said portable telephone apparatus comprising:

first receiving means for receiving an incoming call signal directed to said portable telephone apparatus from said base station;

second receiving means for receiving a holding indication signal transmitted from a device external to said portable telephone apparatus; and hold making means connected to said first and said second receiving means and responsive to said holding indication signal for placing said portable telephone apparatus in said holding mode when said first receiving means receives said incoming call signal.

8. A portable telephone apparatus as claimed in claim 7, wherein said incoming call signal has a first frequency band, said holding indication signal having a second frequency band different from said first frequency band, and wherein said first receiving means is adapted to said first frequency band, said second receiving means being adapted to said second frequency band.

9. A portable telephone apparatus as claimed in claim 7, wherein said incoming call signal has a first frequency band, said holding indication signal having a second frequency band different from said first frequency band, and wherein said first receiving means comprises:

a first filter having said first frequency band; and a first radio section connected to said first filter and said hold making means for receiving said incoming call signal, said second receiving means comprises:

a second filter having said second frequency band; and a second radio section connected to said second filter and said hold making means for receiving said holding indication signal.

10. A portable telephone apparatus as claimed in claim 7, wherein said incoming call signal has a first frequency band, said holding indication signal having a second frequency band different from said first frequency band, and wherein said first and said second receiving means distinguish between said incoming call and said holding indication signals with reference to a difference between said first and said second frequencies, respectively.

11. A portable telephone apparatus as claimed in claim 7, wherein said second receiving means further receives an identification code together with said holding indication signal, said first and said second receiving means distinguishing between said incoming call and said holding indication signals with reference to presence or absence of said identification code.

12. A combination of a portable telephone apparatus and a vibration unit, said portable telephone apparatus comprising:

first receiving means for receiving an incoming call signal directed to said portable telephone apparatus from a base station which is assigned to said portable telephone apparatus;

first transmitting means connected to said first receiving means for transmitting a reception information signal when said first receiving means receives said incoming call signal;

second receiving means for receiving a holding indication signal transmitted from said vibration unit towards said portable telephone apparatus; and second transmitting means connected to said second receiving means for transmitting a holding signal towards said base station when said second receiving means receives said holding indication signal, said base station being responsive to said holding signal to place said portable telephone apparatus in a holding mode in which connection is held between said portable telephone apparatus and said base station, said vibration unit comprising:

unit receiving means for receiving said reception information signal;

a vibrator connected to said unit receiving means for vibrating when said unit receiving means receives said reception information signal;

a holding switch; and unit transmitting means connected to said holding switch for transmitting said holding indication signal towards said portable telephone apparatus in response to operation of said holding switch.

* * * * *